(12) United States Patent
Belpaire (10) Patent No.: US 9,708,013 B2
(45) Date of Patent: Jul. 18, 2017

(54) BONDING WITH ADHESIVE BEADS OR PLOTS

(75) Inventor: Vincent Belpaire, Uccle (BE)

(73) Assignee: SIKA TECHNOLOGY AG, Baar (CH)

( * ) Notice: Subject to any disclaimer, the term of this patent is extended or adjusted under 35 U.S.C. 154(b) by 1032 days.

(21) Appl. No.: 13/061,685

(22) PCT Filed: Sep. 1, 2009

(86) PCT No.: PCT/EP2009/061270
§ 371 (c)(1),
(2), (4) Date: Jun. 20, 2011

(87) PCT Pub. No.: WO2010/023324
PCT Pub. Date: Mar. 4, 2010

(65) Prior Publication Data
US 2011/0236616 A1  Sep. 29, 2011

(30) Foreign Application Priority Data

Sep. 1, 2008  (EP) ..................................... 08163412

(51) Int. Cl.
| | |
|---|---|
| B62D 25/00 | (2006.01) |
| B32B 37/12 | (2006.01) |
| B62D 29/00 | (2006.01) |
| E04C 3/00 | (2006.01) |
| B32B 3/06 | (2006.01) |

(52) U.S. Cl.
CPC ....... *B62D 29/002* (2013.01); *Y10T 428/1452* (2015.01); *Y10T 428/1471* (2015.01); *Y10T 428/24612* (2015.01); *Y10T 428/24802* (2015.01); *Y10T 428/24843* (2015.01); *Y10T 428/24917* (2015.01); *Y10T 428/24926* (2015.01)

(58) Field of Classification Search
CPC ............. B62D 29/002; Y10T 428/1471; Y10T 428/24926; Y10T 428/24802; Y10T 428/24917; Y10T 428/24843; Y10T 428/1452; Y10T 428/24612
USPC ........................................................ 428/40.1
See application file for complete search history.

(56) References Cited

U.S. PATENT DOCUMENTS

| | | | |
|---|---|---|---|
| 6,058,673 A | 5/2000 | Wycech | |
| 6,541,089 B1 * | 4/2003 | Hamerski et al. .......... | 428/40.1 |

(Continued)

FOREIGN PATENT DOCUMENTS

| | | | |
|---|---|---|---|
| EP | 1387789 B1 * | 9/2006 | |
| GB | 2375328 A | 11/2002 | |

(Continued)

OTHER PUBLICATIONS

International Search Report for PCT/EP2009/061270.
(Continued)

*Primary Examiner* — Patricia L Nordmeyer
(74) *Attorney, Agent, or Firm* — Buchanan Ingersoll & Rooney PC (57) ABSTRACT

A reinforcer includes a carrier conforming generally to one or more inner walls of a cavity, and an adhesive arranged in one or more beads between the carrier and the one or more inner walls of the cavity, such that when the one or more adhesive beads is cured, the carrier is adhered to the one or more inner walls defining the cavity.

23 Claims, 5 Drawing Sheets

(56) References Cited

U.S. PATENT DOCUMENTS

| | | | |
|---|---|---|---|
| 6,619,727 B1* | 9/2003 | Barz et al. | 296/187.02 |
| 2003/0099826 A1 | 5/2003 | Juras et al. | |
| 2005/0166532 A1* | 8/2005 | Barz | 52/731.7 |

FOREIGN PATENT DOCUMENTS

| | | |
|---|---|---|
| WO | WO-2004043668 A1 | 5/2004 |
| WO | WO/2006/091794 | 8/2006 |

OTHER PUBLICATIONS

European Office Action dated May 2, 2014.
Office Action (Communication pursuant to Article 94(3) EPC) issued on May 31, 2016, by the European Patent Office in corresponding European Patent Application No. 09809354.5. (6 pages).
Office Action (Second Office Action) issued on May 11, 2016, by the State Intellectual Property Office of China in corresponding Chinese Patent Application No. 201410165743.4, and an English Translation of the Office Action. (8 pages).
Office Action (Communication pursuant to Article 94(3) EPC) issued on Apr. 5, 2017, by the European Patent Office in corresponding European Patent Application No. 09 809 354.5. (5 pgs).

* cited by examiner

BONDING WITH ADHESIVE BEADS OR PLOTS

CROSS-REFERENCE TO RELATED APPLICATIONS

This application claims priority to EP application number 08163412.3 filed on Sep. 1, 2008 and International Application No. PCT/EP2009/061270 filed on Sep. 1, 2009, the entirety of which are hereby incorporated by reference.

BACKGROUND

The present disclosure is directed toward methods and systems for providing structural reinforcement.

Many products have bodies or housings with hollow cavities therein. For example, various consumer appliances and vehicles may have hollow cavities formed between inner and outer panels of the bodies or housings, such as in pillars or within frame members. In particular, some structural members of automobile bodies include a variety of pillars, members, rails, beams, posts, etc. (collectively referred to as "cavities") connected by one or more nodes. Such hollow pillars, beams, etc., often assist in reducing the overall weight of the final product, as well as reducing material costs. However, these cavities often result in a structural member that lacks sufficient strength or energy-absorbing characteristics.

One way to compensate for a weakened structural member is to provide a structural reinforcer within the cavity of the member. Structural reinforcers often include a carrier with an expandable material configured to expand and mold to an inner surface of the structural member. The carrier portion is typically a molded component made from nylon, glass-reinforced nylon, metal, or some combination thereof, and is designed to be lightweight yet stiff. The carrier may also include a plurality of ribs configured to increase the carrier's response to specific stresses.

While effective, the molded carrier structural reinforcers described above have drawbacks. For instance, expandable foam layers generally are relatively large, and provide only moderate strength increases, particularly with regard to shear and tensile stresses. The portions of the reinforcer which are foamable material lack the comparable strength of the molded carrier portion. Further, in order to achieve sufficient expansion of the foam, such reinforcers generally require a large gap between the carrier and an interior wall of a cavity to be reinforced. The required gap between the molded carrier and the interior walls defining the cavity is generally a minimum of 6-10 mm. With a gap of this size, it is possible that the gap will not be properly sealed when the foam expands, due to conditions such as high assembly tolerances, variations in baking conditions, etc. If, for example, the foam does not expand uniformly, it is possible that portions of the gap will remain unsealed, or that the carrier will not be properly secured within the cavity. Further, it is difficult to design a foaming structural reinforcer including one or more channels within the cavity, to allow fluid, such as e-coat fluid, to flow therethrough. Additionally, expandable foam reinforcers generally provide only moderate reinforcement with regard to shear and tensile loads.

Other reinforcers have been designed using an injectable adhesive that flows between the reinforcer and the structural member, to adhere the reinforcer thereto. Using an injectable adhesive allows portions of the gap between a carrier and one or more inner walls of the cavity to be reduced, as it is not necessary to provide room for expansion of the expandable foam across the entire carrier. However, methods including injectable adhesives also have drawbacks. Current methods using injectable adhesives generally require introduction of a sealing material between the carrier and one or more inner walls of the cavity, to prevent the injectable adhesive from flowing out of the cavity. The sealing material generally consists of an expandable foam or mastic. This process thus involves additional steps, and additional materials, including the application of sealing material, and the curing of sealing material, in addition to the subsequent injection and curing of the adhesive material. This requires additional time and expense to create a reinforced part. This also necessitates that timing be more closely controlled, as adhesive generally cannot be injected until the sealing material is at least partially cured. Further, injecting adhesive into a cavity generally fills the entire gap with adhesive, making it difficult to provide channels for e-coat flow.

SUMMARY

The present disclosure is directed to systems and methods for providing structural reinforcement. More specifically, the disclosure is directed to structural reinforcers configured to be adhesively secured within a cavity. The structural reinforcer may include a carrier conforming generally in shape to one or more inner walls defining the cavity. An adhesive is placed on a reinforcer and/or a structural member. The adhesive may retain a substantially stable shape prior to insertion of the reinforcer within the structural member. The present disclosure allows a much closer fit between the carrier of the reinforcer and the inner walls defining a cavity within the structural member. The present disclosure also eliminates the need to use expandable foams or mastics as a sealer along with the adhesive. The present disclosure also simplifies the inclusion of channels between the reinforcer and the structure, for fluid flow, and allows simplified design for localized placement of adhesive. This may allow a reinforcer to be designed using less adhesive, leading to cost savings.

A protective film may also be provided over some or all of the adhesive, and may protect the adhesive from dust, moisture, contaminants, or contact with other elements. This may, for example, allow for adhesive to be placed on a service part prior to the part leaving a factory, while preventing the adhesive curing prematurely.

BRIEF DESCRIPTION OF THE DRAWINGS

While the claims are not limited to the illustrated examples, an appreciation of various aspects is best gained through a discussion of various examples thereof. Referring now to the drawings, a variety of examples are shown in detail. Although the drawings represent the various illustrations, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

Without limitation thereto, exemplary approaches described herein include a structural reinforcer having a carrier configured to provide reinforcement to a structural member. The structural member may be, for instance, a beam, a channel, a pillar, etc., within an appliance, a vehicle, such as an automobile, etc. The reinforcer is adhered to the structural member using an adhesive.

The reinforcer may be made of metal, such as aluminum or steel, plastic, nylon, glass-reinforced nylon, a foam structure, an organic structure, or some combination thereof. In one exemplary approach, the reinforcer is made of a thermoplastic material. The reinforcer may be made through extrusion, through injection molding, or through other suitable process. The reinforcer may include one or more ribs therein to provide localized strengthening, based on a particular application. At least a portion of the reinforcer may be designed to conform closely in shape to a portion of the structural member to which it is to be adhered. For example, one or more outer faces of the carrier portion of the structural reinforcer may be configured to conform generally to one or more inner faces defining a cavity within the structural member. For instance, according to one approach, when the structural reinforcer is positioned proximate the structural member, the gap between portions of the carrier, and one or more inner faces of the structural member to which the carrier is to be adhered, may be less than about 6 millimeters (mm). The size of the gap may be determined or designed based on application needs, production methods, etc. In one approach the gap may be designed to between about 2 mm and about 4 mm. In another exemplary approach, the gap may be designed to be as little as about 0.5 mm or less.

An adhesive is used to secure the reinforcer to the structural member. The adhesive may be applied to the reinforcer, such as along an outer face of the carrier, and/or to the structural member, such as along one or more inner walls defining a cavity in the structural member. The adhesive may be applied prior to placement of the reinforcer proximate the structural member, which may position the carrier member within the cavity. The adhesive may cure while the carrier is positioned within the cavity, thereby adhering the structural reinforcer to the structural member.

Adhesive may be applied as one or more adhesive beads, or plots, on one or more faces of the carrier, and/or on one or more inner faces of the structural member. The length, width, thickness, shape, cross-section, surface, quantity and placement of the adhesive beads or plots may vary as appropriate for any particular application, based on application parameters such as minimizing cost, maximizing strength, speeding assembly time, etc. For example, beads may be applied as a continuous semicircular bead, a series of parallel lines, a series of contiguous plots, a series of round adhesive plots, a series of concentric circles, in a zigzag pattern, or according to any other design. The thickness of adhesive beads may be determined based on specific application needs. In one exemplary approach, the bead thickness is a minimum of about 150% of the width of the gap defined by the opposing surfaces which are mated by the adhesive.

The adhesive employed may be any of a number of adhesives. The chosen adhesive may be substantially non-foaming. That is, the chosen adhesive may expand less than about 20% when curing. In one exemplary approach, the adhesive may expand less than about 5% when curing. In another exemplary approach, the adhesive is non-expandable. The chosen adhesive may have a viscosity that is high enough that the adhesive will retain its bead shape until the reinforcer is positioned within the structural member, yet low enough that the adhesive may be at least partially deformed or displaced upon insertion of the reinforcer within the structural member. In one approach the adhesive may have a paste-like consistency prior to curing, and/or may be tacky. In another approach, the adhesive may act like a Bingham plastic, retaining a substantially stable shape prior to application of sufficient stress. The chosen adhesive may cure through exposure to air, atmospheric moisture, another chemical, heat, light, or according to any other appropriate curing method. According to one approach, the adhesive may be chosen such that the adhesive will cure when exposed to heat, such as during a baking or e-coat process. The adhesive may be, for example, a polymer composition including at least a resin and a hardener. For instance, the adhesive may be a polyurethane composition, a polyurethane and polyol isocyanate composition, an acrylate composition, an epoxide composition, etc. The adhesive may include an epoxy resin and hardener, such as a polyisocyanate or polyamine hardener, microencapsulated acrylic or methacrylate, etc. Suitable adhesives include those adhesives described in patent application serial number WO/2008/077944.

The adhesive may be extruded on the carrier and/or the structural member through an automated process, such as by a robot on an assembly line, or manually, such as by an operator using an extruder gun. The adhesive may be heated to assist in extrusion, or may be applied at ambient temperature. In one exemplary approach, the adhesive may be provided to an assembly location in drums. The adhesive may be provided, for example, in the form of a paste, or a viscous material.

A protective film may be applied over the adhesive, and may prevent the adhesive from curing prematurely, prevent dust or other contaminants from sticking to the adhesive, protect the adhesive from exposure to moisture or air, and/or ensure shelf life and adhesion properties. The protective film may be co-extruded with the adhesive, or may be applied on top of the extruded adhesive. According to one exemplary approach, the protective film may be a plastic, such as polyethylene. The protective film may be removed prior to, during, or after placing the structural reinforcer proximate the structural member. The protective film may be removed, for example, by peeling the protective film from the adhesive, by cutting the film from the adhesive, by the application of heat, chemicals, light, etc., or through other appropriate means.

Figure 1:
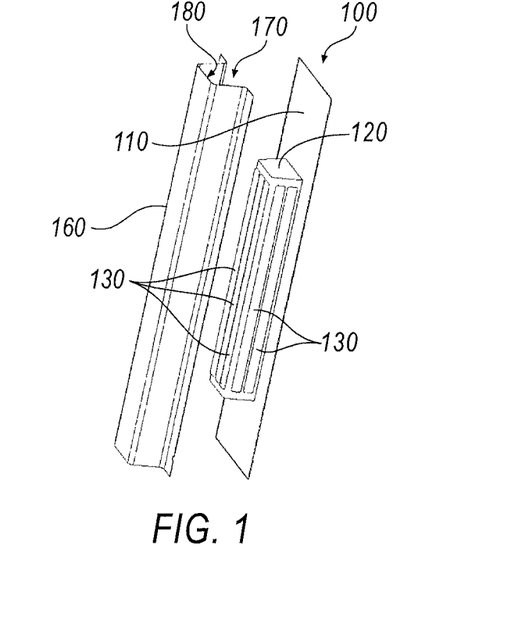
FIG. 1 illustrates an exemplary reinforcer and structural member wherein adhesive is extruded in a series of parallel beads on the carrier.

FIG. 1 illustrates an exemplary reinforcer 100 having a base 110 and a carrier 120 connected thereto. The exemplary carrier portion 120 conforms generally in shape to a cavity 170 defined by one or more interior walls 180 of a structural member 160. The base 110 may include one or more faces that are substantially coplanar with one or more faces of structural member 160, and configured to butt against the structural member 160 to limit the insertion depth of the carrier portion 120 of the reinforcer 100 within the cavity 170 defined by inner walls 180 of structural member 160. It is to be understood that the base 110 may be larger or smaller than the illustrated base 110, and that the base 110 may be omitted entirely, depending on particular application needs. In the exemplary approach of FIG. 1, a plurality of adhesive beads 130 are arranged in a series of parallel rows along the exterior of the carrier 120. The plurality of rows of adhesive beads 130 are positioned such that they will contact one or more inner walls 180 of the structural member 160, when the carrier 120 is positioned within the cavity 170. The size of the gap that is defined between the carrier 120 and the one or more inner walls 180 of the structural member 160 when the carrier 120 is positioned within the cavity 170 may be determined by the design of the carrier 120, and may be less than about 6 mm. In one exemplary approach, the size of the gap may be between about 2 mm and about 4 mm. In a further exemplary approach, the gap may be less than about 0.5 mm. The design of the gap may be influenced, in part, by the production methods used for the structural reinforcer 100 and the structural member 160, by the adhesive 130 used, as well as other factors. When the carrier 120 is positioned in the cavity 170, the adhesive beads 130 may be deformed, or displaced, from an initial position. When the adhesive beads 130 are deformed or displaced, two or more separate adhesive beads 130 may connect, creating one or more larger adhesive beads 130. Additionally, or alternatively, adhesive beads 130 may be positioned such that one or more channels are defined between the carrier 120 and the one or more interior walls 180, to allow fluid, such as e-coat fluid, to flow therein.

Figure 2:
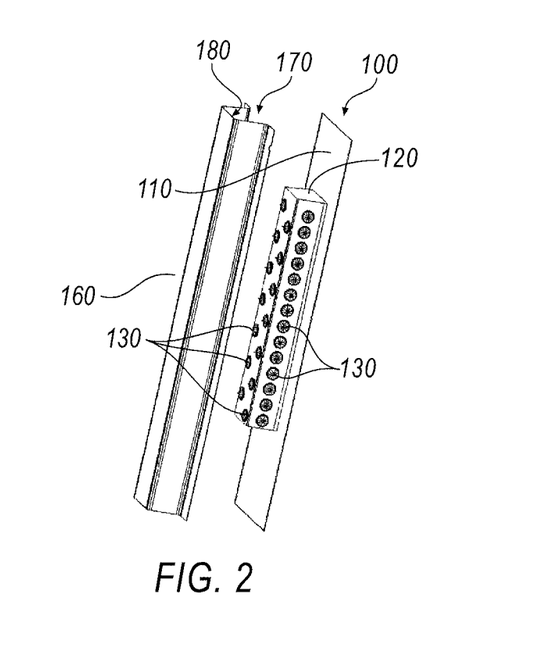
FIG. 2 Illustrates an exemplary reinforcer and structural member wherein adhesive is extruded in a series of circular plots on the carrier.

FIG. 2 illustrates another exemplary reinforcer 100. Reinforcer 100 includes a base 110 with a carrier 120 attached thereto. A plurality of round adhesive beads 130 are positioned at various locations along exterior faces of the carrier 120. The adhesive beads 130 are positioned such that, when the carrier portion 120 of the structural reinforcer 100 is positioned within the cavity 170 defined by inner walls 180 of structural member 160, the adhesive beads 130 will contact the one or more of the inner walls 180. The size, location and quantity of adhesive beads 130 may be chosen based on particular application requirements. Two or more of the adhesive beads 130 may be positioned such that, upon insertion of the carrier 120 into the cavity 170, the two or more adhesive beads 130 will be displaced and will contact each other, thereby forming a larger effective adhesive bead 130. Additionally, or alternatively, adhesive beads 130 may be positioned such that, upon insertion of the carrier 120 into the cavity 170, the adhesive beads 130 may remain separate, providing one or more channels for fluid, such as e-coat fluid, to flow through.

Figure 3:
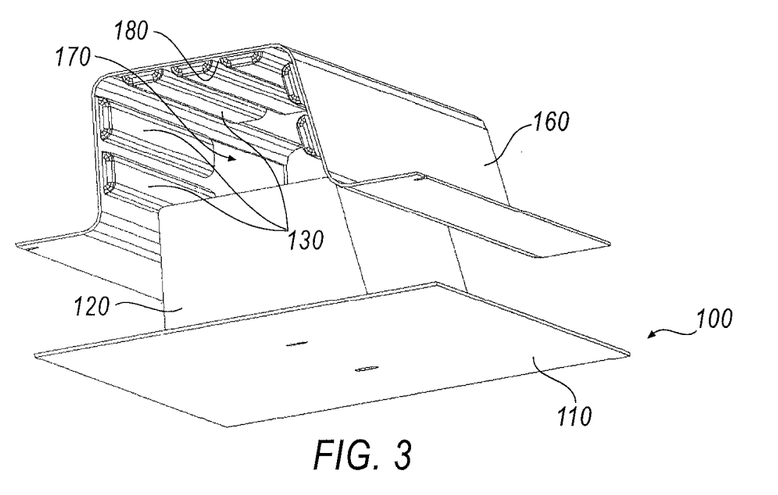
FIG. 3 illustrates an exemplary reinforcer and structural member wherein adhesive is extruded on the structural member.

FIG. 3 illustrates an exemplary reinforcer 100, including a base portion 110 and a carrier portion 120, configured to provide structural support to a structural member 160. Inner walls 180 of the structural member 160 define a cavity 170 therein. Adhesive beads 130 are applied in generally parallel rows along inner faces 180 of structural member 160. When the reinforcer 100 is positioned proximate the structural member 160, the carrier portion 120 is positioned within the cavity 170, proximate the one or more inner walls 180. The adhesive beads 130 include a bead thickness that is greater than the width of a gap defined between the carrier 120 and one or more inner walls 180. When the carrier 120 is positioned within the cavity 170, the adhesive beads 130 thus contact both the carrier 120 and one or more inner walls 180, thereby deforming the adhesive beads 130. The adhesive 130 may thus adhere the carrier 120 within the cavity 170, which adheres the structural reinforcer 100 to the structural member 160.

Figure 4:
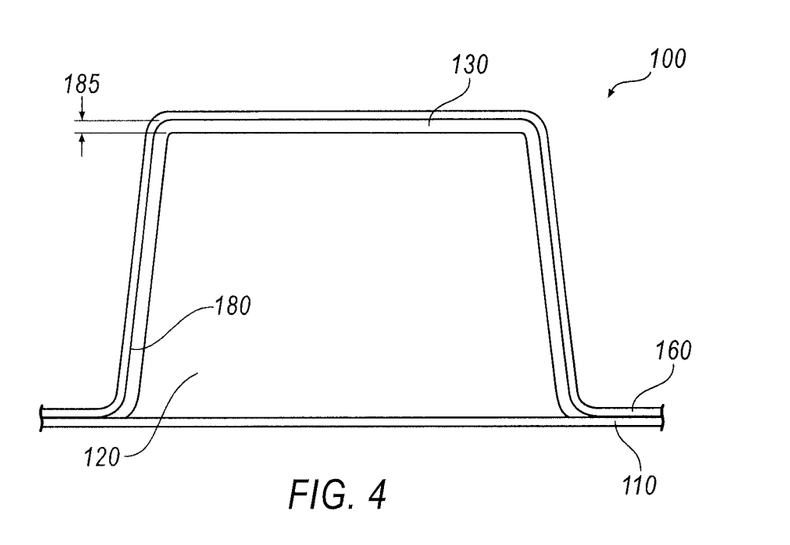
FIG. 4 illustrates an end view of an exemplary reinforcer positioned within a structural member.

FIG. 4 illustrates a cross-sectional end view of an exemplary system including a reinforcer 100 having a base portion 110 and a carrier portion 120. The illustrated reinforcer 100 is positioned proximate a structural member 160. The carrier portion 120 of the reinforcer is positioned within a cavity 170 defined by one or more inner walls 180 of the structural member 160. When the reinforcer 100 is positioned proximate the structural member 160, there is a gap 185 defined between at least a portion of the carrier 120 and at least one inner wall 180 of the structural member 160. Adhesive beads 130 may be displaced within the gap 185, by positioning the carrier 120 proximate the inner wall 180 of the structural member 160, such that the adhesive beads 130 are deformed and substantially fill the entire gap 185. It is to be understood that this is by way of example only, and that adhesive beads 130 may be positioned such that one or more passages are maintained within gap 185 when carrier 120 is positioned within the cavity 170, which may allow fluid, such as e-coat fluid, to flow between the carrier 120 and the one or more inner walls 180 of the structural member 160. The gap 185 between the carrier 120 and the one or more inner walls 180 may be determined in part by the design of the carrier 120, the assembly tolerances of the carrier 120 and the structural member 160, and the particular application. According to one exemplary approach, the gap 185 between the carrier 120 and the structural member 160 may be less than about 6 mm. In another exemplary approach, the gap 185 may be between about 2 mm and 4 mm. In a further exemplary approach, the gap 185 may be less than about 0.5 mm. Placement of adhesive beads 130 may allow selective adhesion of the structural reinforcer 100 to the structural member 160 at one or more locations along the outer surface of the carrier 120, to allow localized strengthening of the structural member 160, while conserving adhesive 130. Adhesive beads 130 may be positioned such that one or more individual beads 130 may combine with one or more additional beads 130 when the carrier 120 is positioned within the cavity 170.

Figure 5:
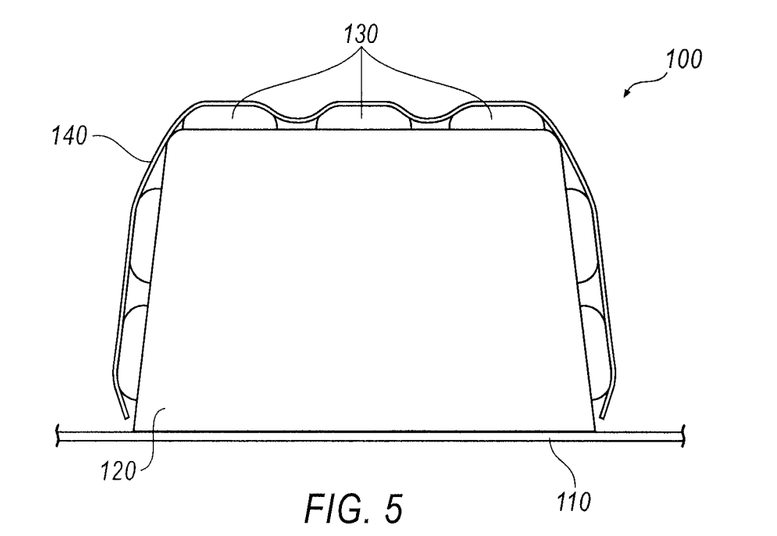
FIG. 5 illustrates an exemplary reinforcer and structural member including a protective film over adhesive beads.

FIG. 5 illustrates an end view of a reinforcer 100 according to an exemplary approach. The reinforcer 100 includes a base 110, and a carrier 120 positioned thereon. The carrier 120 includes a plurality of adhesive beads 130 disposed thereon. In the exemplary approach of FIG. 5, a plurality of adhesive beads 130 are covered by a protective film 140. The protective film 140 may, for example, protect the adhesive beads 130 from dust, moisture, or other contaminants, prevent the beads 130 from adhering to one or more elements prior to installing the reinforcer 100 within the structural member 160, etc. Additionally, or alternatively, the film 140 may prevent adhesive beads 130 from curing until the film 140 is removed. Protective film 140 may thus allow adhesive beads 130 to be disposed on a carrier 120, or a structural member 160, prior to placing carrier 120 into a cavity 170, without the adhesive 130 prematurely curing. Such an approach may be particularly useful for aftermarket or service applications, or for other applications where an adhesive may cure when exposed to air, or to atmospheric moisture. For example, adhesive beads 130 may be applied to a carrier 120 at a factory, and the structural reinforcer 100 may subsequently be shipped to a service location, without the adhesive 130 beginning to cure. Protective film 140 may be removed prior to placing carrier 120 within a cavity 170, such as by peeling or cutting the film 140, etc. Film 140 may also be removed after the carrier 120 of structural reinforcer 100 has been positioned within cavity 170, such as through application of heat, pressure, chemicals, or other suitable means.

Figure 6:
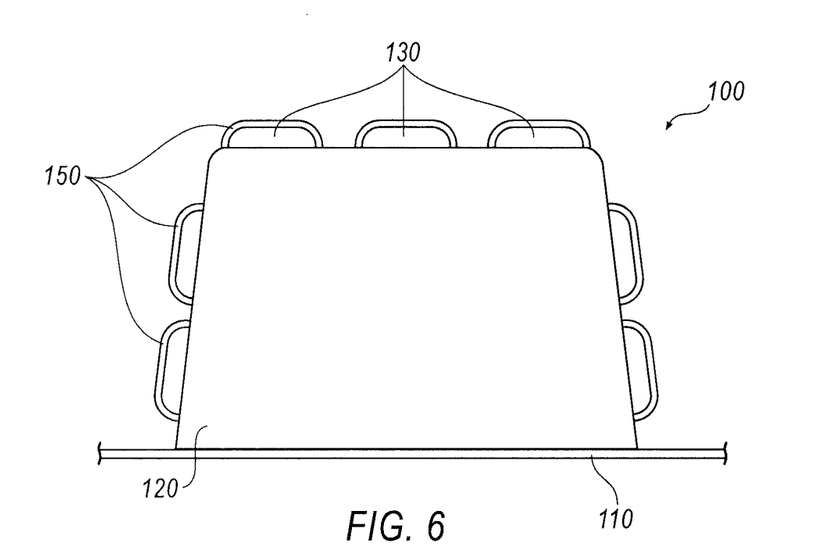
FIG. 6 illustrates an exemplary reinforcer and structural member including a plurality of protective films.

FIG. 6 illustrates an end view of a reinforcer 100 according to an exemplary approach. The reinforcer 100 includes a base 110, and a carrier 120 positioned thereon. A plurality of adhesive beads 130 are disposed across the carrier 120. Each of the plurality of adhesive beads 130 may be covered by a respective protective film 150. Providing individual protective films 140 for adhesive beads 130 may further protect the integrity of a reinforcer 100. For example, by providing individual protective films 140, should an individual film 140 may be punctured or flawed, the remaining films 140, and the respective adhesive beads 130 they protect, may remain intact.

Figure 7A:
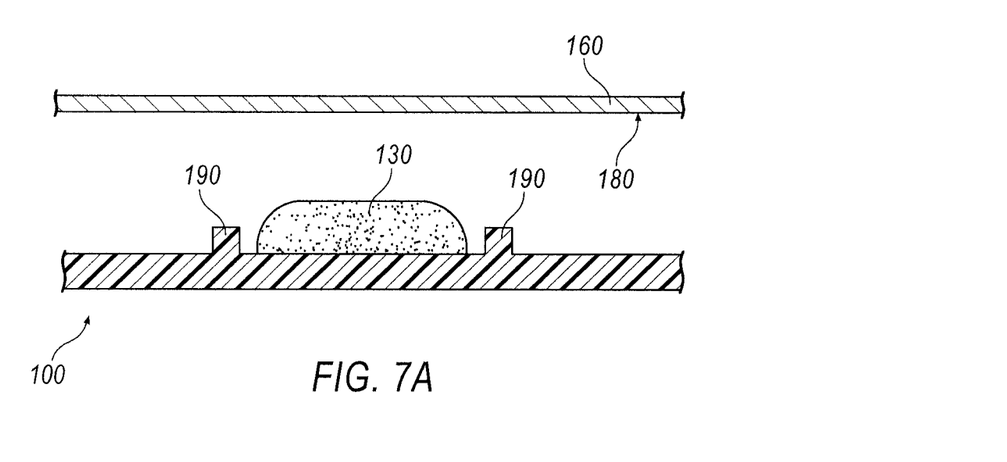
FIGS. 7A and 7B illustrate an exemplary reinforcer and structural member.
Figure 7B:
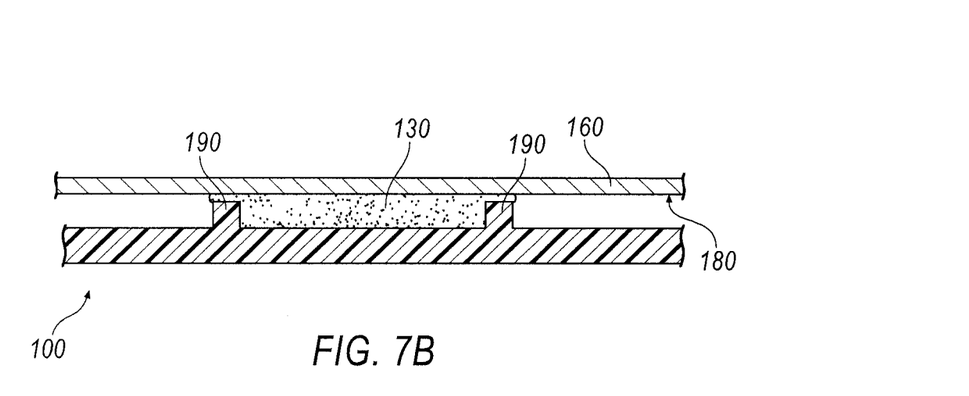

FIGS. 7a and 7b illustrate a partial view of a reinforcer 100. Reinforcer 100 includes a carrier portion 120 having one or more protrusions 190 mounted thereon. One or more adhesive beads 130 may be disposed proximate the one or more protrusions 190. The protrusions 190 may assist in directing the flow of adhesive beads 130 when the adhesive beads 130 are deformed, such as when a carrier 120 is positioned within the cavity 170. FIG. 7a illustrates the carrier 120 prior to the installation of the reinforcer 100. An adhesive bead 130 is illustrated in an undeformed position, between two protrusions 190. FIG. 7b illustrates the reinforcer 100 of FIG. 7a after the carrier 120 has been positioned within cavity 170. The adhesive bead 130 has been deformed, and has taken a shape defined in part by protrusions 190. The protrusions 190 may thus be configured to direct the flow of the adhesive 130, when the structural reinforcer 100 is installed in a structural member 160.

Figure 8:
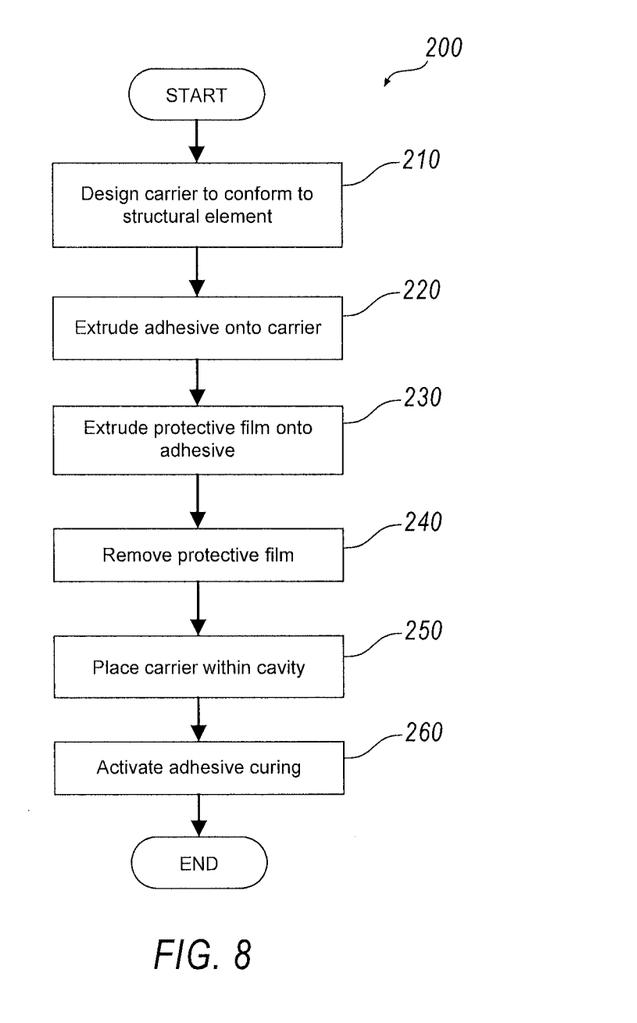
FIG. 8 is a flowchart illustrating a method of fabricating a reinforcer according to an exemplary approach.

FIG. 8 is a flowchart illustrating an exemplary method 200 of reinforcing a cavity of a structural element, such as cavity 170 of structural member 160, using a reinforcer such as reinforcer 100. At step 210, a reinforcer 100 is designed such that the carrier 120 of the reinforcer 100 conforms closely to inner walls 180 of the structural member 160.

At step 220, one or more adhesive beads 130 are extruded onto one or more outer faces of carrier 120. Additionally, or alternatively, adhesive beads 130 may be extruded onto one or more inner walls 180 of a structural member 160. Adhesive 130 may be extruded automatically, for example, using an automated assembly line, or may be extruded manually, such as by a user employing an extruder gun.

At step 230, a protective film 140 is extruded onto one or more adhesive beads 130. The protective film 140 may be extruded onto one or more adhesive beads 130 in concert with extrusion of adhesive beads 130, or may be disposed thereon after the adhesive beads 130 have been extruded.

At step 240, the protective film 140 is removed. The film 140 may be removed by, for example, peeling off the film 140, or by the application of an element such as heat or a chemical to the film. It is to be understood that the structural reinforcer 100 may, for example, be transported from a first location to another, or that time may elapse, between the application of the film 140 in step 230 and the subsequent removal of the film 140 in step 240.

At step 250, the carrier portion 120 of the reinforcer 100 is placed within a cavity 170 defined by one or more inner walls 180 of a structural member 160. As the carrier 120 is positioned within the cavity 170, one or more adhesive beads 130 may be displaced and/or deformed as the gap between the carrier 120 and one or more inner walls 180 of structural member 160 is reduced.

At step 260, the adhesive beads 130 may begin to cure. Curing of the adhesive beads 130 may begin automatically, for example, upon exposure of the adhesive beads 130 to air or moisture. Curing of the adhesive beads 130 may also be activated or accelerated through the application of one or more elements, such as heat, light, chemicals, etc. For example, adhesive beads 130 may be activated through heat, such as the heat associated with baking during an e-coat or painting process. Curing the adhesive beads 130 may adhere the structural reinforcer 100 to the structural member 160.

In addition to the embodiments disclosed, the surface of the carrier 120 of the reinforcer and/or the walls 180 of the structural member may be treated with surface treatments to improve the bonding of the adhesive 130. Various surface treatments include sandblasting, using an abrasive, pickling, using plasma, using a corona discharge, flaming, adhesive abrading, chromic acid etching, iodine treatment, use of primers, sodium treatment, surface grafting, surface roughening, thermal treatment, transcrystalline growth, and/or UV exposure. The surface treatment may also help improve the bonding of other materials.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as limiting.

Accordingly, it is to be understood that the above description is intended to be illustrative and not restrictive. The above description is intended to be illustrative and not restrictive. Many approaches and applications other than the examples provided would be apparent to those skilled in the art upon reading the above description. The scope of the present disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future approaches. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system for reinforcing a structural member, comprising:

a structural reinforcer including a rigid carrier portion made of at least one of metal, plastic, nylon, glass-reinforced nylon, and an organic material;

at least a portion of the carrier portion configured to conform generally to one or more inner walls defining a cavity in the structural member, the structural member generally made of at least one of metal, plastic, carbon fiber, and organic material; and an adhesive, which is generally tacky to the touch, applied to one or more locations on one or both of the carrier and an inner wall, prior to insertion of the carrier within the cavity, to adhere the carrier to the one or more inner walls of the cavity when the carrier is positioned therein;

wherein a thickness of said adhesive prior to insertion of the carrier into the cavity is the same as or greater than a gap that exists between the carrier and the inner wall at the location of the adhesive subsequent to insertion of the carrier into the cavity, such that said adhesive simultaneously contacts said carrier and an inner wall upon insertion of the carrier into the cavity;

wherein a fluid flow path is maintained parallel to and between said carrier and said inner wall to which said carrier is adhered;

wherein adhering the carrier within the cavity increases the strength of the structural member.

2. The system of claim 1, wherein the adhesive has an expansion rate of less than about 20% when curing.

3. The system of claim 1 wherein the adhesive has an expansion rate of less than about 5% when curing.

4. The system of claim 1, wherein the adhesive is non-expandable.

5. The system of claim 1, wherein the adhesive is extruded as one or more beads or plots on at least one of the carrier and the one or more inner walls.

6. The system of claim 1, wherein the gap between the carrier and the one or more inner walls of the cavity is between about 4 mm and about 0.5 mm.

7. The system of claim 1, wherein the gap between the carrier and the one or more inner walls of the cavity is less than about 0.5 mm.

8. The system of claim 1, wherein the adhesive is a polymer composition.

9. The system of claim 1, wherein the adhesive is formed from a mixture of thermoplastic resins and epoxy resins.

10. The system of claim 1, wherein the adhesive has a viscosity high enough that the adhesive may retain a shape until said carrier is positioned within cavity, and low enough that the adhesive may be deformed or displaced when carrier is positioned within cavity.

11. The system of claim 1, wherein the adhesive has a maximum initial thickness of less than about 12 millimeters.

12. The system of claim 1, wherein the adhesive is configured to cure in an e-coat process.

13. The system of claim 1, further comprising one or more protrusions defined on an outer surface of the carrier, the one or more protrusions configured to direct flow of the adhesive when the carrier is installed within the cavity.

14. The system of claim 1, wherein said adhesive is configured to deform upon insertion of the carrier into the cavity.

15. The system of claim 1, wherein said thickness of said adhesive prior to insertion of the carrier into the cavity is greater than said gap.

16. The system of claim 1, wherein said adhesive is extruded onto said carrier.

17. The assembly of claim 1, wherein said adhesive is applied to at least two separate locations on one or both of a generally planar side of said carrier and inner wall, and said fluid flow path is a channel bound by said two separate adhesive locations and said inner wall and said generally planar side of said carrier.

18. An assembly for reinforcing a structural member having a plurality of inner walls that together define an internal cavity, comprising:

a rigid structural reinforcer member, wherein at least a portion of said structural reinforcer member generally conforms to at least one of the inner walls; and an adhesive, which is generally tacky to the touch, and which is applied at one or more locations on one or both of said reinforcer member and an inner wall prior to insertion of the reinforcer member within the cavity, to adhere the reinforcer member to the inner wall when the reinforcer member is positioned in the cavity;

wherein a thickness of said adhesive prior to insertion of the reinforcer member into the cavity is the same as or greater than a distance that exists between the reinforcer member and the inner wall at the location of the adhesive subsequent to insertion of the reinforcer member into the cavity and prior to any expansion of said adhesive, such that said adhesive simultaneously contacts said reinforcer member and the inner wall upon insertion of the reinforcer member into the cavity;

wherein a fluid flow path is maintained parallel to and between said carrier and said inner wall to which said carrier is adhered.

19. The assembly of claim 18, wherein said adhesive is applied to the structural reinforcer member.

20. The assembly of claim 18, wherein said adhesive is applied to at least one of the inner walls.

21. The assembly of claim 18, wherein said adhesive is substantially non-expanding.

22. The assembly of claim 18, wherein said adhesive is configured to deform upon insertion of said reinforcer member into the cavity.

23. The assembly of claim 18, wherein said adhesive is applied to at least two separate locations on one or both of a generally planar side of said carrier and inner wall, and said fluid flow path is a channel bound by said two separate adhesive locations and said inner wall and said generally planar side of said carrier.

* * * * *